United States Patent
Kawakami

[15] 3,680,900
[45] Aug. 1, 1972

[54] COUPLING MEMBER
[72] Inventor: Eiichi Kawakami, Hekinan, Japan
[73] Assignee: Aisin Seiki Kabushiki Kaisha, Kariya, Aichi Pref., Japan
[22] Filed: April 7, 1971
[21] Appl. No.: 131,944

[52] U.S. Cl. ................................... 287/93, 287/20.5
[51] Int. Cl. ............................................. F16b 17/00
[58] Field of Search ............................. 287/93, 20.5

[56] References Cited

UNITED STATES PATENTS

| 3,007,725 | 11/1961 | Becker et al. ............ 287/93 X |
| 3,164,054 | 1/1965 | Biesecker .................. 287/93 X |

FOREIGN PATENTS OR APPLICATIONS

| 969,534 | 9/1964 | Great Britain ................... 287/93 |
| 1,145,467 | 3/1969 | Great Britain ................... 287/93 |
| 861,050 | 2/1961 | Great Britain ................... 287/93 |

Primary Examiner—Andrew V. Kundrat
Attorney—Pierce, Scheffler & Parker

[57] ABSTRACT

A coupling member of resilient material adapted for connecting together two members, comprising a head portion engaging with the upper face of one of the two members, a walled portion engaging with a hole formed on the one member, boss portions having a larger diameter than the hole in the one member, resilient supporting portions for holding one end of the other member and knife edge means provided at the free end of the supporting portions to form a groove at the one end of the other member by rotation of the other member or the coupling member and the one member.

4 Claims, 5 Drawing Figures

PATENTED AUG 1 1972 3,680,900

3,680,900

COUPLING MEMBER

BACKGROUND OF THE INVENTION

This invention relates to a coupling member, and more particularly to a coupling member capable of connecting together two members.

It has heretofore been known in the art that coupling members are advantageously employed on various devices for the purpose of connecting firmly two members, namely, the coupling member is at first inserted into a hole formed one member, and then the other member is inserted into a hole formed in the coupling member. But, the other member is apt to be withdrawn from the conventional coupling member which may not positively engage other member. In order to prevent the other member from being withdrawn from the coupling member, the other member is inserted into the hole of the coupling member, and then the pointed end of the coupling member is engaged with a groove being previously formed on the other member. Otherwise, a snap ring to make a firm connection with the coupling member is mounted on the other member. However, in these connecting members, the groove which must have measured accuracy of the other member must be manufactured. As a result, loose-connection may occur between one member, the coupling member and other member due to an error in manufacture, and further it takes considerable time to construct. These deficiencies are considered as a great disadvantage and short-comings in practice.

SUMMARY OF THE INVENTION

It is the most important object of the present invention to provide a coupling member capable of connecting together firmly two members.

Another important object of the invention is the provision of a coupling member which is advantageous in substantial saving manufacturing costs.

The present invention overcomes the deficiencies mentioned above by providing a coupling member capable of firmly connecting members together, namely, a supporting portion of the coupling member is at first inserted into a hole formed in one member, and then one end portion of the other member is inserted into the hole of the coupling member. Further, when the other member or the coupling member together with one member is rotated in a clockwise or counter-clockwise direction, a groove is formed on one end portion of the other member by a knife edge portion formed on the coupling member.

Other objects and features of novelty of the invention will be specifically pointed out or will become apparent when, referring to the following description taken in conjunction with the accompanying drawing.

DESCRIPTION OF THE PREFERRED EMBODIMENT

Figure 1:
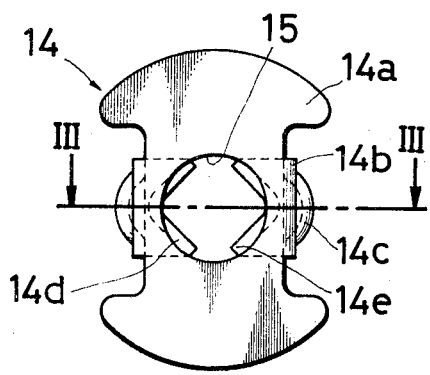
FIG. 1 is a front view of a coupling member embodying features of the present invention.
Figure 2:
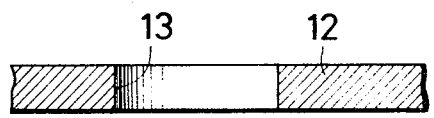
FIG. 2 is a sectional view of one member.
Figure 3:
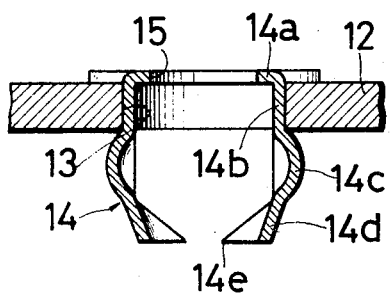
FIG. 3 is a sectional view of the coupling member taken along the line III—III of FIG. 1, showing its coupled condition to the one member of FIG. 2.
Figure 4:
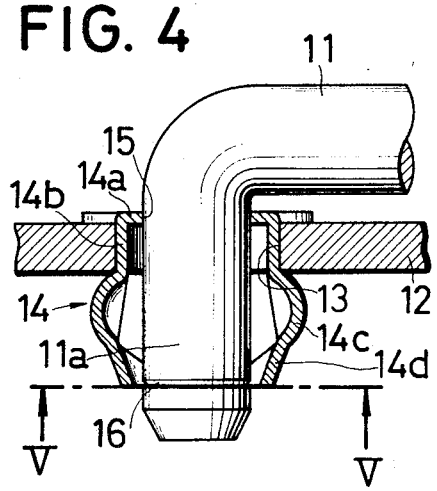
FIG. 4 is a sectional view of the coupling member which connects two members.
Figure 5:
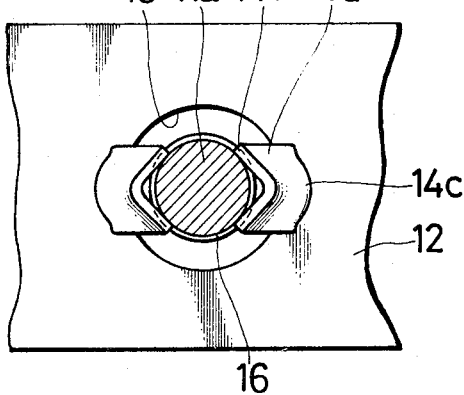
FIG. 5 is a bottom view of the coupling member, the other member being sectioned along the line V—V of FIG. 4.

Referring to FIG. 1, the numeral 14 is coupling member having a hole 15, therethrough the numeral 12 in FIG. 2 of the members to be coupled having a hole 13 therethrough. As will be seen in FIG. 3, the coupling member 14 comprises a head portion 14a, a walled portion 14 b, a pair of boss portions 14 c, a pair of supporting portions 14d, having a V-shape, and a pair of knife edge portions 14e each being provided on one of the pair of the supporting portions 14d, the boss portion 14c being of a larger diameter than the hole 13 thereby preventing the coupling member 14 from being withdrawn from member 12. Referring to the construction, the supporting portions 14d of the coupling member 14 are inserted into the hole 13 of member 12, and then the boss portions 14c are forcibly pushed through the hole 13, so that the coupling member is fixed to the member 12 by the head portion 14a and the boss portion 14c thereof as will be seen in FIG. 3. Further one end portion 11a of the other member 11 is inserted into the hole 15 of the coupling member 14, thereby being supported by the supporting portions 14d of the coupling member 14. Thereafter, when the member 11 or the coupling member 14 together with the member 12 is rotated in a clockwise or counter-clockwise direction, a groove 16 is formed on one end portion 11a of the member 11 by the knife edges 14e of the coupling member 14 as seen in FIGS. 4, and 5. Thus, the member 12, the coupling member 14, and the member 11 are firmly secured to each other.

Since the coupling member 14 is formed with a harder material than the member 11, the groove 16 can be formed on the end portion 11a by permitting the knife edges 14e to cut into the outer surface thereof. How ever, the tightening force imparted on the end portion 11a by the supporting portions 14d is not so great as to sever the end portion 11a during the rotating operation of the member 11. When a force tending to withdraw the member 11 from the coupling member 14 and member 12 is applied, the member 11 can not be withdrawn therefrom, since the knife edges 14e of the coupling member with its resilient force cuts into one end portion 11a of the member 11, while the walled portion 14b of the coupling member 14 remains with the member 12 because of the head portion 14a and the boss portions 14c.

Although the present invention has been illustrated and described in connection with a specific embodiment, various modifications will become apparent to those skilled in the art from the description in conjunction with the appended claims without departing from the scope and spirit of the present invention.

What is claimed is:

1. A coupling member for connecting a first member and a second member together, wherein the first member has a hole therethrough and the second member has a circular cross section, said coupling member being composed of a resilient material and having (1) a head portion for engaging the first member adjacent the hole therethrough, a hole through said head portion, (2) a tubular walled portion adapted to extend through and engage the hole in the first member, (3) at least one boss portion having a diameter greater than the diameter of the tubular walled portion to enable said coupling member to be locked in the hole in the first member, (4) at least one supporting means depending from the at least one boss portion for engaging the second member when inserted in the hole in said coupling member, and (5) knife edge means directed inwardly from the at least one supporting means whereby when the second member is inserted in said coupling member and when there is relative rotation between said coupling member and the second member, a circular groove is provided in the second member for locking engagement of said coupling means with the second member.

2. A coupling member as claimed in claim 1 wherein said coupling member is provided with a pair of opposed boss portions and a pair of opposed supporting means and each supporting means is provided with a pair of said knife edge means.

3. A coupling member as claimed in claim 2 wherein each supporting means has a V-shaped cross section for engaging the second member.

4. A coupling device as claimed in claim 1 wherein the circular groove is provided when the coupling member is rotated with respect to the second member.

* * * * *